United States Patent [19]

Memering

[11] Patent Number: 4,668,741

[45] Date of Patent: May 26, 1987

[54] VINYL POLYMER COMPOSITION AND PROCESS FOR MAKING SAME

[75] Inventor: Leroy J. Memering, Cincinnati, Ohio

[73] Assignee: National Distillers and Chemical Corporation, New York, N.Y.

[21] Appl. No.: 786,424

[22] Filed: Oct. 11, 1985

[51] Int. Cl.⁴ .................... C08L 27/06; C08L 33/04
[52] U.S. Cl. .................... 525/229; 525/222; 525/227; 525/228; 525/85; 524/523; 524/524
[58] Field of Search ............. 525/222, 228, 85, 229

[56] References Cited

U.S. PATENT DOCUMENTS

| | | | |
|---|---|---|---|
| 3,457,330 | 7/1969 | Buning | 525/222 |
| 4,123,585 | 10/1978 | Sparzak et al. | 525/190 |
| 4,220,734 | 9/1980 | Kosugi et al. | 525/85 |
| 4,518,515 | 5/1985 | Ott et al. | 525/80 |

FOREIGN PATENT DOCUMENTS

| | | |
|---|---|---|
| 3204144 | 8/1983 | Fed. Rep. of Germany . |
| 59-168047 | 9/1984 | Japan . |
| 924457 | 4/1963 | United Kingdom . |

*Primary Examiner*—Carman J. Seccuro
*Attorney, Agent, or Firm*—Kenneth D. Tremain

[57] ABSTRACT

A vinyl polymer composition comprising a vinyl polymer, a heat stabilizer, an impact modifier and an ethylene-vinyl acetate copolymer having improved impact resistance is disclosed. A process for forming the vinyl polymer composition is also set forth. In this process an improved processing aid, an ethylene-vinyl acetate copolymer, is blended with a vinyl polymer, a heat stabilizer and an impact modifier.

16 Claims, No Drawings

VINYL POLYMER COMPOSITION AND PROCESS FOR MAKING SAME

BACKGROUND OF THE DISCLOSURE

1. Field of the Invention

The present invention is directed to an improved vinyl polymer composition and the method of making same. More particularly, the present invention is directed to an improved vinyl polymer composition which incorporates an ethylene-vinyl acetate copolymer and process for making same.

2. Background of the Prior Art

Vinyl polymers, of which polyvinyl chloride is the most common, are commonly employed in a myriad of applications. No small reason for this wide acceptance is the incorporation of additives that specially modify the polymer to satisfy various property requirements. For example, vinyl polymers, especially polyvinyl chloride (PVC), are sensitive to heat. Therefore, a heat stabilizer is usually added to PVC to form a heat stable PVC composition. Lubricants form an essential component in many vinyl polymer compositions in that these compositions are oftentimes extruded or injected molded. External lubricants serve to reduce the polymer's tendency to stick to hot metal surfaces while internal lubricants increase the flow of the vinyl polymer particles within the melt. Pigments and colorants are added to provide the desired color to the polymer. An important attribute of rigid vinyl polymers is toughness. Toughness is increased with the addition of an impact modifier. Other additives may optionally also be incorporated in vinyl polymer compositions. For example, fillers, which reduce the cost and decrease gloss, are, in many cases, incorporated in these compositions.

The blending of these additives into vinyl polymers to produce a uniform composition represents a major, technical undertaking. That is, with the incorporation of these various additives, the mixing together of the components into a melt at sufficiently low viscosity represents a difficult technological development. To assist in decreasing the melt viscosity to a level which is processible by various mixing apparatus, is the function of processing aids. These processing aids are added to the composition to substantially improve the processing behavior of the vinyl composition. Processing aids provide this function by decreasing melt viscosity. Among the processing aids commonly added to vinyl polymer compositions to decrease processing difficulties are styrene-acrylonitrile copolymers and acrylic polymers.

Although these processing aids permit blending of the components into a vinyl polymer composition they do not function as efficiently as could be desired. This lack of processing efficiency detracts from certain critical properties in the rigid vinyl polymer product. These adverse effects are caused by the inability of the processing aids of the prior art to effect rapid fusion at low melt viscosity. As a result, compositions employing these processing aids of the prior art require higher blending temperatures than would otherwise be the case. This processing limitation adversely affects the physical properties of the resultant vinyl composition. Vinyl polymer compositions formulated with processing aids of the prior art are thus oftentimes characterized by inadequate and non-uniform impact strengths. In addition, surface appearance of these prior art rigid vinyl polymer compositions leave much to be desired.

The use of ethylene-vinyl acetate copolymers as an additive in vinyl polymer compositions is known in the art. However, the ethylene-vinyl acetate copolymers provided in the prior art vinyl polymer compositions were employed to improve impact strength. For example, U.S. Pat. No. 3,125,545 discloses an improved impact strength vinyl chloride resin using about 2 to 50 percent by weight of an ethylene-vinyl alkanoate copolymer as an impact improver.

U.S. Pat. No. 3,283,035, also representative of the prior art, describes a polyvinyl chloride resin provided with increased impact strength by the addition of an ethylene-vinyl alkanoate copolymer and a chlorinated polyolefin.

U.S. Pat. No. 3,457,330 teaches a resin composition having improved impact strength which is a ternary mixture of a vinyl chloride resin, an ethylene-vinyl acetate copolymer and polyethylene.

U.S. Pat. No. 3,517,083 sets forth a vinyl chloride polymer having improved impact strength which comprises a blend of 1 to 50 parts by weight of a solid ethylene-vinyl acetate copolymer and 50 to 99 parts by weight of a vinyl chloride polymer.

SUMMARY OF THE INVENTION

It has now been discovered that a new processing aid incorporated in a vinyl polymer composition which includes an impact modifier provides improved processing characteristics and results in the formation of an improved vinyl polymer composition. These improved characteristics include improved impact strength and surface appearance over the vinyl polymer compositions which incorporate the impact modifiers and processing aids of the prior art.

In accordance with the instant invention an improved rigid vinyl polymer composition is provided. This composition is characterized by the incorporation of an ethylene-vinyl acetate copolymer, a heat stabilizer and an impact modifier into a vinyl polymer.

In further accordance with the instant invention a process is provided for preparing a rigid vinyl polymer composition. This process is characterized by the incorporation into a vinyl polymer of a heat stabilizer, an impact modifier and an ethylene-vinyl acetate copolymer.

DETAILED DESCRIPTION

The rigid vinyl polymer composition of the present invention incorporates therein, as a processing aid, an ethylene-vinyl acetate copolymer (EVA). The EVA employed in the rigid vinyl polymer composition of this invention is preferably present in a concentration of 1 to 5 parts per 100 parts of the vinyl polymer (1–5 phr). More preferably, the concentration of the EVA in the polymer composition is in the range of 1 to 3 parts per 100 parts of vinyl polymer (1–3 phr).

Although any ethylene-vinyl acetate copolymer may be employed as a processing aid in the formulation of the vinyl polymer composition, it is particularly preferred that the EVA comprise between 15% and 80% by weight vinyl acetate (15–80% VA), based on the total weight of the EVA. More preferably, the EVA contemplated for use in the polymer of the present invention comprises 20 to 60 percent by weight vinyl acetate (20–60% VA), based on the total weight of the EVA. Most preferably, the EVA of the present invention comprises 28–40% by weight vinyl acetate (28-40% VA), again based on the total weight of the EVA.

The vinyl polymer composition of this invention incorporates, in addition to the EVA processing aid, other components, the principal one of which is, of course, the vinyl polymer. The vinyl polymer contemplated in the present invention is any homopolymer or copolymer of a vinyl monomer. Of the vinyl polymers within the contemplation of this invention, polyvinyl chloride is most preferred.

Another component included in the composition of this invention is a heat stabilizer. This additive is critical due to the heat sensitivity of vinyl polymers. A preferred class of heat stabilizers employed in the composition of the present invention are organotin compounds. Preferably, 1 to 5 parts by weight of the heat stabilizer is incorporated into the composition per 100 parts of vinyl polymer (1-5 phr). More preferably, 1 to 3 phr of heat stabilizer is incorporated in the composition of this invention.

A particularly critical additive in the rigid vinyl polymer of the present invention is an impact modifier. This additive increases the impact strength of the vinyl polymer. Typically, polymeric acrylates are utilized to provide this function. They are usually incorporated into the composition in a concentration of 3 to 10 parts by weight per 100 parts (3-10 phr) by weight of vinyl polymer. It is preferred, however, that the impact modifier be provided in a concentration of 5 to 10 phr.

Yet another commonly employed component which may be included in the composition of this invention is a pigment or colorant. A particularly preferred pigment additive is titanium dioxide. The pigment or colorant is preferably provided in a concentration of from about 0.1 to about 20 parts by weight per 100 parts of vinyl polymer (0.1-20 phr). More preferably, pigment or colorant is present in a concentration of 5 to 15 phr.

Lubricants may also be incorporated in the composition of this invention. Of the commonly employed lubricants, stearates, stearamides and the like are preferred. These ingredients are preferably provided in an amount of 1 to 5 parts by weight per 100 parts of vinyl polymer (1-5 phr). The use of lubricants in a concentration of 2 to 4 phr is more preferred.

The present invention is also directed to a process for forming a vinyl polymer composition. In this process an ethylene-vinyl acetate copolymer is employed as a processing aid. In a preferred embodiment of this process, the EVA is provided in a concentration of 1 to 5 parts EVA per 100 parts of vinyl polymer. More preferably, the EVA is present in a concentration of 1 to 3 parts per 100 parts of vinyl polymer.

The EVA preferred for use in this process comprises 15-80% by weight of vinyl acetate (VA), based on the total weight of the EVA employed. More preferably, the EVA employed in this process comprises 20-60 weight percent VA. Most preferably, the EVA used in this process comprises 28 to 40 weight percent VA, wherein these percentages are based on the total weight of EVA copolymer.

The process of forming a rigid vinyl polymer includes the step of including as principal constituent a vinyl polymer, which in a preferred embodiment is PVC. The process of this invention also includes the step of incorporating a heat stabilizer into the vinyl polymer composition. In this process the heat stabilizer is present in a concentration of 1 to 5 parts of heat stabilizer per 100 parts of vinyl polymer. More preferably, the concentration of the heat stabilizer, in the composition of this invention, is in the range of 1 to 3 phr. Although there is a large class of heat stabilizers that can be employed, in a preferred embodiment the heat stabilizer is an organotin compound, preferably an alkyltin compound, and most preferably, dimethyltin.

Yet another step in the process of this invention is the incorporation into the composition of an impact modifier. In the process of this invention 3 to 10 parts by weight of impact modifier per 100 parts of vinyl polymer are blended into the vinyl polymer composition. More preferably, 5 to 10 parts per 100 parts of vinyl polymer are incorporated in the composition in this process.

A preferred step in the process of making the vinyl polymer composition of this invention is the blending into the composition of a pigment or colorant. Preferably, the pigment is present in a concentration of 5 to 15 phr. More preferably, 5-15 phr of pigment is added in the process of this invention. In a preferred embodiment, the pigment employed is titanium dioxide.

Another preferred step provided in the process of this invention, to produce the vinyl polymer composition, is the blending therein of one or more lubricants. The total concentration of lubricant ranges from 1 to 5 parts, preferably 2 to 4 parts, per 100 parts of vinyl polymer. In a preferred embodiment the lubricant employed in this process is one or more stearates or bis-stearamides.

In this process it is preferred that the components of the composition be placed in a preheated vessel in which the vinyl polymer, preferably PVC, is initially disposed. A heat stabilizer is charged into the mixing vessel concurrent with the vinyl polymer, to insure against heat degradation of the vinyl polymer, and the two components are mixed. To this mixture is added the processing aid of the present invention. With the temperature raised moderately, the three components are mixed together. At least one lubricant is, in a preferred embodiment, next added to the mixture. The lubricant is added to the mixture while mixing continues at a temperature slightly elevated above the temperature used to blend the processing aid into the composition. The next additive blended into the composition is the impact modifier. While mixing continues the temperature of the impact modifier included mixture is raised again. It is emphasized that the impact modifier is added to the blend of vinyl polymer, heat stabilizer and ethylene-vinyl acetate copolymer in the embodiment wherein a lubricant is not included in the composition. Finally, if a pigment is provided, it is blended into the mixture with a concurrent increase in mixture temperature. It is emphasized that the above described mixing procedure preferably occurs at atmospheric pressure obviating the need for high pressure equipment.

The following examples are given to illustrate the scope of the instant invention. Since these examples are given for illustrative purposes only, the scope of this invention should not be limited thereto.

EXAMPLE 1

A Henschel [trademark] mixer open to the atmosphere was preheated to 180° F. Two thousand three hundred grams of Geon [trademark] 103EP-F76 polyvinyl chloride was placed into the heated mixer. Upon addition of the polyvinyl chloride resin the resin was subjected to mixing at a rotational speed of 2400 revolutions per minute (rpm). Concurrent with the addition of the polyvinyl chloride to the mixer, 46 gm of Advastab

[trademark] TM 181 dimethyl tin, representing 2 parts by weight per 100 parts of PVC charged into the vessel, was added thereto. Mixing continued at 180° F. with the mixer rotating at 2400 rpm.

To the PVC-dimethyl tin mixture was added 46 gms of Microthene [trademark] MU 80011, an ethylene-vinyl acetate copolymer which comprises 28% by weight VA. The 46 grams of the EVA processing aid represented 2 parts by weight per 100 parts of PVC. The addition of the processing aid did not result in a change in mixing speed, which continued at 2400 rpm. However, upon addition of the EVA, the temperature of the mixture was raised to 190° F.

Two lubricants were then added to the mixture: 46 grams of Synpro [trademark] 12B calcium stearate, representing 2 parts by weight per 100 parts PVC (2 phr), and 46 gms of Advawax [trademark] 280 bis-stearamide, also provided at a concentration of 2 phr. These lubricants were added to the mixture while the mixer continued operating at 2,400 rpm. The temperature was raised, upon addition of the lubricants, to 200° F.

One hundred thirty-eight grams of an impact modifier, Acryloid [trademark] KM 323B, an acrylate polymer, representing 6 phr, was then added to the mixture. While no change in mixing speed accompanied this addition, the admixture of the impact modifier was accompanied by a temperature increase of the mixture to 220° F.

Finally, a titanium dioxide pigment, Titanox [trademark] 2101 was added to the mixture with a concurrent rise in temperature to a final drop temperature of about 230°±5° F. The mixing speed, 2,400 rpm, maintained throughout the admixture operation, remained constant.

All of the above recited components of the composition were added over a period of 6 to 8 minutes. As stated above, upon addition of all the ingredients the total composition was removed from the mixer at about 230° F. and cooled to a temperature in the range of between 120° and 130° F. The cooled composition was sized by screening through a 30 mesh screen.

The polyvinyl chloride composition, made in accordance with the above procedure, was mixed in a two-roll mill at 385° F. for 10 minutes. The composition was then disposed in compression molds to produce 6 inch by 6 inch by ⅛ inch plaques. These plaques were tested for notched Izod impact strength in accordance with ASTM Test Procedure D-256 at room temperature. The average impact strength of these plaques was 22.4 foot-pounds per inch with a standard deviation of 0.6 foot-pound per inch.

A summary of this example is included in Table 1.

EXAMPLE 2

A composition was prepared using the procedure of Example 1 but for the substitution of a different processing aid for the EVA of Example 1. Instead of 2 phr of Microthene [trademark] MU 80011, which is an ethylene-vinyl acetate copolymer comprising 28% by weight vinyl acetate, a blend of 10% calcium stearate and 90% Vynathene [trademark] EY 901-25, an ethylene-vinyl acetate copolymer comprising 40 weight percent VA was substituted. Sixty-nine grams of this blend, representing 3 phr, replaced the 2 phr of the Microthene [trademark] MU 80011 ethylene-vinyl acetate copolymer of Example 1. In that the mixture contained 10 weight percent calcium stearate, the weight of the calcium stearate component, Synpro [trademark] 12B, was reduced such that it was present in the composition in a concentration of 1.8 phr.

The polyvinyl chloride composition made in accordance with this example was made into plaques and tested to determine its impact strength in accordance with the procedure of Example 1. This composition had an average notched Izod impact strength of 21.6 ft-lbs/in with a standard deviation of 1.0 ft-lb/in.

Table 1 includes a summary of this example.

EXAMPLE 3

The procedure of Example 1 was repeated albeit with different additive levels to produce a distinguished vinyl chloride polymer composition. Both the calcium stearate and bis-stearamide constituents were reduced by half. More significantly, 23 grams of Microthene [trademark] MU 80011 EVA (28% VA) copolymer was provided, representing 1 phr, half the concentration of Example 1. An equal mass, 23 grams of a processing aid of the prior art, the acrylate polymer Acryloid [trademark] K120N, again 1 phr, was also included in the composition together with the 1 phr of the ethylene-vinyl acetate copolymer of the present invention.

This composition was processed into 6 inch by 6 inch by ⅛ inch plaques in accordance with the procedure of in Example 1 and tested for impact strength. The average notched Izod impact strength was 12.5 ft-lbs/in with a standard deviation of 7.5 ft-lbs/in.

A tabulated summary of this example is provided in Table 1.

EXAMPLES 4–6

Compositions were prepared in accordance with the procedure of Example 1. However, the quantity of impact modifier, the acrylate polymer Acryloid [trademark] KM323B, was reduced by half to 69 grams, such that in each of the three examples Examples 4–6, the concentration of the impact modifier was 3 phr. In Examples 4 and 5, 1 phr (23 gms) of the prior art processing aid, the acrylate polymer Acryloid [trademark] K120N, was incorporated into the composition. In addition, in Example 4, 3 phr of the 28% VA, EVA copolymer of the present invention, Microthene [trademark] MU 80011, was employed. In Example 5 the acrylate processing aid of the prior art was supplemented with 23 grams of a processing aid of the present invention, a mixture of 90% Vynathene [trademark] EY 901-25, and 10% calcium stearate. Example 6 did not utilize any prior art processing aid. Rather, 3 phr of the Microthene [trademark] MU 80011 of the present invention was exclusively utilized.

After processing in accordance with the procedure enumerated in Example 1, the compositions of Examples 4–6 were tested. Impact strength values for the plaques of Examples 4–6 of 3.9 ft-lb/in, with a standard deviation of 0.3 ft-lb/in; 3.3 ft-lb/in, with a standard deviation of 0.6 ft-lb/in; and 3.8 ft-lb/in, with a standard deviation of 0.6 ft-lb/in were measured for the compositions of Examples 4–6, respectively. These values were determined in accordance with the notched Izod test of ASTM Test Procedure D-256 at room temperature.

Table 1 tabulates these examples.

EXAMPLES 7 and 8

The procedure of Example 1 was repeated with the exception that the identity and concentration of the processing aids were altered. In both Examples 7 and 8, 2 phr of Microthene [trademark] MU 80111 EVA copolymer was employed as a processing aid. In addition, the composition of Example 7 incorporated 2 phr of the acrylic processing aid of the prior art, Acryloid [trademark] K120N. No processing aid other than Microthene [trademark] MU 80111 was provided in Example 8. The procedure of Example 1 was repeated to the extent that the impact modifier was again included at a concentration of 6 phr.

The compositions formed in accordance with the procedure of Examples 7 and 8 were formed into plaques and tested for impact strength in accordance with the notched Izod impact strength test of Example 1. The average notched Izod impact strength of plaques formed from the composition of Example 7 was 20.4 ft-lb/inch with a standard deviation of 1.3 ft-lb/in. The average notched Izod impact strength of the composition of Example 8 was 20.7 ft-lb/in with a standard deviation of 1.0 ft-lb/in.

Summaries of Examples 7 and 8 are tabulated in Table 1.

COMPARATIVE EXAMPLE 1

Example 1 was duplicated but for the substitution of 2 phr of Acryloid [trademark] K120N, the prior art acrylate polymer processing aid, for the Microthene [trademark] MU80011 28% VA EVA copolymer of Example 1. The composition, made in accordance with this example, was processed into plaques in accordance with the procedure of Example 1. The plaques were tested for impact strength pursuant to the procedure enumerated in Example 1. The average notched Izod impact strength of the plaques was 11.1 ft-lb/in with a standard deviation of 7.6 ft-lb/in.

Comparative Example 1 is included, with the summaries of Examples 1–8, in Table 1.

EXAMPLES 9-11

Three additional compositions was prepared, in accordance with the procedure of Example 1, including the formation of plaques, which were tested for Izod notched impact strength in accordance with ASTM Test Procedure D-256. In Examples 9-11 lower concentrations of the processing aids of the present invention, the 28% VA EVA copolymer, Microthene [trademark] MU 80011, or the mixture of 10% calcium stearate and 90% Vynathene [trademark] EY 901-25, the 40% VA EVA copolymer, were utilized.

A summary of these examples, including impact strength test results is incorporated in Table 1.

TABLE 1

| | Example No. | | | |
|---|---|---|---|---|
| | 1 | CE1 | 2 | 3 |
| Components (parts by wt.) | | | | |
| Geon 103 EP-F76 (PVC) | 100 | 100 | 100 | 100 |
| Advastab TM 181 (DMT) | 2 | 2 | 2 | 2 |
| Acryloid K120N (Acrylate) | — | 2 | — | 1 |
| Microthene MU 80011 (EVA) | 2 | — | — | 1 |
| 10% Ca Stearate/90% Vynathene EY 901-25 | — | — | 3 | — |
| Synpro 12B (Ca Stearate) | 2 | 2 | 1.8 | 1 |
| Advawax 280 (Bis-stearamide) | 2 | 2 | 2 | 1 |
| Acryloid KM 323B (Acrylate) | 6 | 6 | 6 | 6 |
| Titanox 2101 (TiO$_2$) | 12 | 12 | 12 | 12 |
| Impact Strength | | | | |
| Notched Izod, ft-lb/in. | 22.4 | 11.1 | 21.6 | 12.5 |
| Standard Deviation | 0.6 | 7.6 | 1.0 | 7.5 |

TABLE 1-continued

| | Example No. | | | |
|---|---|---|---|---|
| | 4 | 5 | 6 | 7 |
| Components (parts by wt.) | | | | |
| Geon 103 EP-F76 (PVC) | 100 | 100 | 100 | 100 |
| Advastab TM 181 (DMT) | 2 | 2 | 2 | 2 |
| Acryloid K120N (Acrylate) | 1 | 1 | — | 2 |
| Microthene MU 80011 (EVA) | 3 | — | 3 | 2 |
| 10% Ca Stearate/90% Vynathene EY 901-25 | — | 3 | — | — |
| Synpro 12B (Ca Stearate) | 1 | 0.7 | 1 | 1 |
| Advawax 280 (Bis-stearamide) | 1 | 1 | 1 | 1 |
| Acryloid KM 323B (Acrylate) | 3 | 3 | 3 | 6 |
| Titanox 2101 (TiO$_2$) | 12 | 12 | 12 | 12 |
| Impact Strength | | | | |
| Notched Izod, ft-lb/in. | 3.9 | 3.3 | 3.8 | 20.4 |
| Standard Deviation | 0.3 | 0.6 | 0.6 | 1.3 |

| | 8 | 9 | 10 | 11 |
|---|---|---|---|---|
| Components (parts by wt.) | | | | |
| Geon 103 EP-F76 (PVC) | 100 | 100 | 100 | 100 |
| Advastab TM 181 (DMT) | 2 | 2 | 2 | 2 |
| Acryloid K120N (Acrylate) | — | — | — | — |
| Microthene MU 80011 (EVA) | 2 | — | — | 1 |
| 10% Ca Stearate/90% Vynathene EY 901-25 | — | 1 | 2 | — |
| Synpro 12B (Ca Stearate) | 1 | 1.9 | 1.8 | 2 |
| Advawax 280 (Bis-stearamide) | 1 | 2 | 2 | 2 |
| Acryloid KM 323B (Acrylate) | 6 | 6 | 6 | 6 |
| Titanox 2101 (TiO$_2$) | 12 | 12 | 12 | 12 |
| Impact Strength | | | | |
| Notched Izod, ft-lb/in. | 20.7 | 13.8 | 19.0 | 9.7 |
| Standard Deviation | 1.0 | 7.2 | 2.3 | 8.5 |

COMPARATIVE EXAMPLES 2-5

Four compositions were prepared generally in accordance with the procedure of Example 1. However, these compositions differed from the composition of Example 1 by the absence of an impact modifier. Thus, these compositions, denoted Comparative Examples 2–5, were each devoid of Acryloid KM 323B, the acrylate polymer added in Example 1 as an impact modifier.

In all four comparative examples 2 parts by weight of the dimethyl tin heat stabilizer Advastab [trademark] TM 181 was added to 100 parts by weight of Geon 103 EP-F76 PVC. Comparative Example 2 differed further from the composition of Example 1 by the absence of the processing aid of the present invention. Rather, a processing aid of the prior art, the acrylate polymer Acryloid [trademark] K 120N, was provided in a concentration of 2 parts per 100 parts of the PVC. In addition, the stearate, bis-stearamide and titanium dioxide additives were provided in the same concentration as in Example 1.

Comparative Example 3 was a composition differing from the composition of Comparative Example 2 only to the extent that 2 parts by weight ethylene-vinyl acetate copolymer of the present invention, Microthene [trademark] MU 80011, replaced the 2 parts of acrylate polymer of the prior art, Acryloid [trademark] K 120N, per 100 parts of PVC.

In Comparative Example 4 the composition was the same as Comparative Example 3 but for the substitution of an alternate preferred EVA copolymer of the present invention, the mixture of 90% Vynathene [trademark] EY 901-25 and 10% calcium stearate for Microthene [trademark] MU 80011. In order to maintain the stearate concentration in the composition constant, the stearate-containing constituent Synpro [trademark] 12B was correspondingly reduced to 1.8 parts.

The last composition, Comparative Example 5, was the same as Comparative Example 3 except that the concentration of the EVA copolymer, Microthene [trademark] MU80011 was reduced by half to 1 part by weight per 100 parts of PVC.

All of the compositions were formed into plaques and tested in accordance with the procedure of Example 1. The resultant impact strength for the four comparative examples is reported in Table 2. Table 2, in addition, summarizes the constituents of Comparative Examples 2-4. For comparative purposes Table 2 includes the same composition and impact strength data of Example 1.

TABLE 2

| Components, parts by wt. | Example No. | | | | |
|---|---|---|---|---|---|
| | 1 | CE2 | CE3 | CE4 | CE5 |
| Geon 103 EP-F76 (PVC) | 100 | 100 | 100 | 100 | 100 |
| Advastab TM 180 (DMT) | 2 | 2 | 2 | 2 | 2 |
| Acryloid K120N (Acrylate) | — | 2 | — | — | — |
| Microthene MU 80011 | 2 | — | 2 | — | 1 |
| 10% Ca Stearate/ 90% Vynathene EY 901-25 | — | — | — | 2 | — |
| Synpro 12B (Ca Stearate) | 2 | 2 | 2 | 1.8 | 2 |
| Advawax 280 (Bis-stearamide) | 2 | 2 | 2 | 2 | 2 |
| Acryloid KM 323B (Acrylate) | 6 | — | — | — | — |
| Titanox 2101 (TiO$_2$) | 12 | 12 | 12 | 12 | 12 |
| Impact Strength | | | | | |
| Notched Izod, ft-lb/in. | 22.4 | 1.4 | 2.0 | 2.5 | 1.9 |

EXAMPLE 12

Compositions made in accordance with Examples 1-11 and CE1 were each tested to determine their effectiveness as extrusion compositions. In each case samples of the compositions were disposed in a Brabender [trademark] ¾ inch single screw extruder. In each case the temperature profile of the extruder was as follows: in the zone furthermost from the die, 300° F.; in the zone downstream of the furthermost zone, 347° F.; in the third zone, closest to the die, 356° F.; and at the die, 387° F. In each case the screw was rotated at 60 rpm and the die opening was set at 20 mils. The melt temperature and falling weight impact strength were approximately the same in each example. It is noted that falling weight impact strength is a test to determine polyaxial impact stress of polymeric material having flat surfaces. The falling weight impact strength test, measured in inch-pounds per mil., is defined in ASTM Test Procedure No. D 3679.

Table 3 provides a summary of this example including a description of the surface appearance of each of the extruded compositions.

TABLE 3

| Composition of Example 1 | Melt Temp., °F. | Fall. Wt. Impact Str. in lbs/mil. | Surface Appearance |
|---|---|---|---|
| 1 | 392 | 2.5 | Smooth, gloss; Slight flow lines at the edges |
| CE1 | 392 | 2.3 | Smooth, gloss; Flow lines at the center |
| 2 | 391 | 2.5 | Smooth, gloss; Very slight flow lines at the center |
| 3 | 391 | 2.3 | Smooth, gloss; Flow lines at the center |
| 4 | 392 | 2.3 | Slightly grainy, gloss; Flow lines at the center |
| 5 | 393 | 2.4 | Slightly grainy, gloss; Slight flow lines at the center |
| 6 | 392 | 2.4 | Slightly grainy, gloss; Slight flow lines at the center |
| 7 | 393 | 2.4 | Smooth, gloss; Flow lines at the center |

EXAMPLE 13

The compositions of Examples 9 through 11 were tested to determine melt temperature and falling weight impact strength in accordance with the procedure of Example 12. The results of these tests, which were run under the same conditions as Example 12, are summarized in Table 4. It is noted that Table 4 includes extrusion pressure. The higher the extrusion pressure the greater the melt viscosity of the composition.

In this example, the surface appearance of the compositions of Examples 9 to 11 is described in terms of 75° gloss and yellowness index (YI). These are standard surface characteristics defined by ASTM Test No. D 1223 and ADTM Test No. D 1925, respectively. Briefly, 75° gloss is a measure of the capacity of a surface to reflect light. The higher the 75° gloss, the glossier the surface. The yellowness index (YI) is a measure of the degree of yellowness relative to magnesium oxide. The higher the YI the more yellow and less attractive is the surface.

TABLE 4

| Exam. No. | Extrusion Conditions | | |
|---|---|---|---|
| | Melt Temp., °F. | Press, psi | Rate, gpm |
| 9 | 389–390 | 5,000 | 39.0 |
| 10 | 389–390 | 4,800 | 37.9 |
| 11 | 388–391 | 4,300 | 30.7 |

| Example No. | Test Results | |
|---|---|---|
| | Falling Wt. Impact Str. inch-lb/mil. | Surface Appearance |
| 9 | 2.6 | Smooth, Glossy 75° gloss = 9.1; YI = 3.2 |
| 10 | 2.6 | Smooth, glossy 75° gloss = 9.1; YI = 3.0 |
| 11 | 2.8 | Smooth, glossy slight flow lines in center of sheet 75° gloss = 9.2 YI = 3.0 |

EXAMPLE 14

The compositions of Examples 1-8 and CE1 were tested to determine their rheological characteristics. To provide this data a torque rheometer commonly used to test PVC, a Brabender Plastograph [trademark], was utilized. The oil-heated mixing chamber of the Plastograph was set at 345° F. (174° C.). This oil temperature was continually monitored by a thermocouple inserted in the chamber. The sample, in each case 63 grams, of the PVC composition was introduced into the mixing chamber of the Plastograph under ram pressure. Upon introduction of the PVC composition the blades of the Plastgraph (No. 6 roller rotor blades) were turned on. As the rotor blades rotated the heat of friction increased the temperature of the PVC composition. This increase in temperature caused fusion of the powdered resin composition. The time to reach fusion as well as the temperature of the melt at fusion was recorded. In addition, the torque required to turn the roller blades at the fusion temperature was noted. The test continued for 15 minutes after fusion of the PVC composition was attained. Additional readings were taken 5, 10 and 15 minutes after the fusion temperature was reached.

The results of this example are summarized in Table 5. These results establish the stability of the compositions of the present invention. Because all of the compositions tested required lesser torque with increasing time after fusion it was concluded that degradation (manifested by crosslinking) did not occur. Torque is directly proportional to melt viscosity. Melt viscosity, in turn, is increased upon crosslinking. Since torque decreased melt viscosity decreased which established that the PVC composition did not crosslink in the 15 minutes subsequent to the attainment of the fusion temperature.

TABLE 5

| Composition of Example No. | FUSION | | |
|---|---|---|---|
| | Time, Min. | Temp, °F. | Torque, m-gm |
| 1 | 0.8 | 358 | 3,050 |
| CE1 | 0.6 | 360 | 3,850 |
| 2 | 1.1 | 360 | 3,020 |
| 3 | 0.8 | 358 | 3,810 |
| 4 | 0.9 | 360 | 3,590 |
| 5 | 0.9 | 360 | 3,580 |
| 6 | 0.8 | 360 | 3,280 |
| 7 | 0.7 | 362 | 3,790 |
| 8 | 1.1 | 365 | 3,350 |

| Composition of Example No. | 5 MIN | | 10 MIN | |
|---|---|---|---|---|
| | Temp, °F. | Torque, m-gm | Temp, °F. | Torque, m-gm |
| 1 | 391 | 2,170 | 395 | 2,050 |
| CE1 | 390 | 2,290 | 395 | 2,170 |
| 2 | 391 | 2,260 | 395 | 2,060 |
| 3 | 384 | 2,360 | 398 | 2,230 |
| 4 | 392 | 2,300 | 397 | 2,170 |
| 5 | 393 | 2,300 | 397 | 2,170 |
| 6 | 392 | 2,270 | 397 | 2,120 |
| 7 | 395 | 2,350 | 400 | 2,230 |
| 8 | 394 | 2,300 | 397 | 2,170 |

| Composition of Example No. | 15 MIN | |
|---|---|---|
| | Temp, °F. | Torque, gm-meter |
| 1 | 396 | 2,030 |
| CE1 | 396 | 2,130 |
| 2 | 396 | 2,030 |
| 3 | 399 | 2,190 |
| 4 | 398 | 2,130 |
| 5 | 398 | 2,150 |
| 6 | 397 | 2,090 |
| 7 | 401 | 2,200 |
| 8 | 398 | 2,150 |

EXAMPLE 15

Example 14 was repeated using the compositions of Examples 9-11. For comparative purposes the compositions of Examples 1 and CE1 were retested in this example.

The results of this example are tabulated in Table 6.

TABLE 6

| Composition of Example No. | FUSION | | |
|---|---|---|---|
| | Time, Min. | Temp, °F. | Torque |
| 9 | 1.4 | 365 | 2,800 |
| 10 | 1.3 | 365 | 2,710 |
| 11 | 1.4 | 365 | 2,740 |
| 1 | 1.3 | 362 | 2,620 |
| CE1 | 1.1 | 360 | 3,270 |

| Composition of Example No. | 5 MIN | | 10 MIN | |
|---|---|---|---|---|
| | Temp, °F. | Torque, gm-meters | Temp, °F. | Torque, gm-meters |
| 9 | 387 | 2,160 | 393 | 1,990 |
| 10 | 388 | 2,190 | 392 | 1,980 |
| 11 | 388 | 2,190 | 393 | 1,990 |
| 1 | 388 | 2,210 | 394 | 1,970 |
| CE1 | 390 | 2,280 | 395 | 2,070 |

| Composition of Example No. | 15 MIN | |
|---|---|---|
| | Temp, °F. | Torque, gm-meters |
| 9 | 395 | 1,950 |
| 10 | 394 | 1,950 |
| 11 | 394 | 1,980 |
| 1 | 394 | 1,940 |
| CE1 | 396 | 2,040 |

EXAMPLE 16

A rheological test, similar to the test of Examples 14 and 15, was conducted, again in the Brabender Plastograph [trademark] used in those examples. A Number 6 roller was rotated at 63 rpm at a bowl temperature of 195° C. Each sample was run for a sufficiently long period of time such that a maximum and equilibrium torque for each composition was determined. The maximum torque is, as suggested by its description, the highest torque obtained during the test. Equilibrium torque, which in these tests occurred subsequent to attainment of maximum torque, is the minimum torque constant over a relatively long period of time. The dynamic thermal stability, determined also during this test, is the time from fusion until the end of equilibrium torque. The dynamic thermal stability, then, is a measure of the time required, at elevated temperatures, for the composition to degrade. It is appreciated, by those skilled in the art, that after equilibrium torque is reached, the temperature no longer decreases or remains constant. Rather, the temperature increases signalling crosslinking and degradation of the composition.

The results of this test are presented in Table 7.

TABLE 7

| Composition of Exam. No. | Maximum Torque, grams | Equilibrium Torque, gm-meters |
|---|---|---|
| 1 | 2,760 | 1,640 |
| CE1 | 3,380 | 1,660 |
| 2 | 2,730 | 1,630 |
| 3 | 3,440 | 1,740 |
| 4 | 3,200 | 1,700 |
| 5 | 3,400 | 1,720 |
| 6 | 3,000 | 1,630 |
| 7 | 3,450 | 1,750 |
| 8 | 3,060 | 1,680 |

| Composition of Exam. No. | Maximum Temp., °F. | Dynamic Thermal Stability, minutes |
|---|---|---|
| 1 | 420 | 19 |

TABLE 7-continued

| | | |
|---|---|---|
| CE1 | 423 | 16 |
| 2 | 420 | 18 |
| 3 | 422 | 14.8 |
| 4 | 421 | 17.2 |
| 5 | 420 | 18.2 |
| 6 | 420 | 18 |
| 7 | 423 | 16.5 |
| 8 | 421 | 16.9 |

EXAMPLE 17

Example 16 was repeated except that the compositions tested were those made in accordance with Examples 9–11. Again, to insure consistency, the compositions of Examples 1 and CE1 were retested in this example. Unlike Example 16, maximum torque was not recorded. However, dynamic thermal stability, maximum temperature and equilibrium torque were noted.

The results of these tests are summarized in Table 8 which appears below.

TABLE 8

| Composition of Ex. No. | Temp., °F. | Torque at Degradation, gm-meters | Dynamic Thermal Stability, min. |
|---|---|---|---|
| 9 | 421 | 1,500 | 14.5 |
| 10 | 422 | 1,480 | 13.5 |
| 11 | 422 | 1,500 | 15.0 |
| 1 | 422 | 1,490 | 14.4 |
| CE1 | 423 | 1,580 | 14.8 |

DISCUSSION

The results of the above examples establish that improved results are obtained from the novel use of EVA as a processing aid compared to the processing aids of the prior art. This is illustrated in the comparison between the composition of Example 1 and the composition of Comparative Example 1. These two examples represent an exact comparison in that the only difference between them is the use of an ethylene-vinyl acetate copolymer in Example 1 and the same amount of an acrylic polymer of the prior art in Example CE1. All comparisons between the two compositions establish that the composition of Example 1, made in accordance with the present invention, is superior.

The impact strength of the composition of Example 1 is double that of Comparative Example 1. Equally significant is the standard deviation, representative of the uniformity of the composition. Whereas the standard deviation of the composition of Example 1 was a very low 0.6, the standard deviation of the composition of Comparative Example 1 was a very high 7.6.

The results summarized in Table 2 establish the unexpectedly improved results obtainable with the use of an impact modifier in combination with the ehtylene-vinyl acetate copolymer processing aid of this invention compared to the prior art teachings which employ ethylene-vinyl acetate copolymers in vinyl polymer compositions in the absence of separate impact modifiers. Thus, Example 1 represents a composition within the scope of the present invention which has an impact strength of 22.4 ft-lbs/in. Comparative Examples 2–5 represent compositions of the prior art wherein the impact strength varies over a range of 1.4 to 2.5 ft-lb/inch. Obviously, the prior art use of ethylene-vinyl acetate copolymers in vinyl polymer compositions is clearly inferior to the compositions of this invention.

The surface appearance of extruded polymer formed from the composition of Example 1 was better than that of Comparative Example 1. Whereas both compositions produced glossy smooth surfaces, the composition of the present invention, the composition of Example 1, had only slight flaw lines at the edges. The composition of CE1 had flaw lines in the center of the extruded sheet.

The maximum torque at fusion of the composition of Example 1, 3,050 meter-grams, was significantly lower than the torque for the composition of Comparative Example 1, 3,850 gm-meters. In addition the maximum torque developed after 5, 10 and 15 minutes was lower in the examples of the present invention than that of the composition of the prior art. This comparison establishes the improved processability of PVC compositions containing ethylene-vinyl acetate copolymers as processing aids compared to the PVC compositions of the prior art which include other processing aids.

The same conclusion is drawn from the dynamic thermal stability data. The maximum torque developed in the composition of the present invention, the composition of Example 1, 2760 gm-meters, was significantly lower than the maximum torgue developed in the composition of the prior art, 3,380 gram-meters (Comparative Example 1).

Likewise, the 19 minutes to reach degradation, or dynamic thermal stability time, for the composition of Example 1, a composition within the scope of the present invention, was significantly greater than the 16 minutes required by the composition of the prior art, the composition of Comparative Example 1.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A polymeric composition having a more uniform and improved impact strength comprising a vinyl chloride polymer, a polymeric acrylate impact modifier and a copolymer consisting of ethylene and vinyl acetate, said copolymer present in a concentration of 1 to 5 parts by weight per 100 parts by weight of said vinyl chloride polymer.

2. A composition in accordance with claim 1 wherein said ethylene-vinyl chloride acetate copolymer comprises 1 to 3 parts by weight per 100 parts of said vinyl polymer.

3. A composition in accordance with claim 1 wherein said polymeric acrylate impact modifier is present in the concentration in the range of between 3 and 10 parts by weight per 100 parts by weight of said vinyl chloride polymer.

4. A composition in accordance with claim 1 wherein said heat stabilizer is present in a concentration in the range of between 1 and 5 parts by weight per 100 parts by weight of said vinyl chloride polymer.

5. A composition in accordance with claim 1 comprising at least one lubricant present in the concentration in the range of between 1 and 6 parts by weight per 100 parts by weight of said vinyl chloride polymer.

6. A composition in accordance with claim 1 comprising a pigment, said pigment present in a concentration of between 0.1 and 20 parts by weight per 100 parts by weight of said vinyl chloride polymer.

7. A composition in accordance with claim 1 wherein said ethylene-vinyl acetate copolymer comprises between 15 and 80% by weight vinyl acetate, based on the total weight of said ethylene-vinyl acetate copolymer.

8. A composition in accordance with claim 7 wherein said ethylene-vinyl acetate copolymer comprises between 20 and 60% by weight vinyl acetate, based on the total weight of said ethylene-vinyl acetate copolymer.

9. A composition in accordance with claim 8 wherein said ethylene-vinyl acetate copolymer comprises between 28 and 40% by weight vinyl acetate based on the total weight of said ethylene-vinyl acetate copolymer.

10. A process for preparing a rigid vinyl polymer composition having a more uniform and improved impact strength comprising blending a heat stabilizer, a polymeric acrylate impact modifier and a copolymer consisting of ethylene and vinyl acetate into a vinyl chloride polymer, said copolymer present in a concentration in the range of between 1 and 5 parts by weight per 100 parts by weight of said vinyl chloride polymer.

11. A process in accordance with claim 10 wherein said heat stabilizer is present in a concentration in the range of between 1 and 5 parts by weight per 100 parts by weight of said vinyl chloride polymer and said polymeric acrylate impact modifier is present in a concentration in the range of between 3 and 10 part by weight per 100 parts by weight of said vinyl chloride polymer.

12. A process in accordance with claim 10 wherein said ethylene-vinyl acetate comprises between 15 and 80% by weight vinyl acetate, based on the total weight of said ethylene-vinyl acetate polymer.

13. A process in accordance with claim 12 wherein said ethylene-vinyl acetate comprises between 20 and 60% by weight vinyl acetate, based on the total weight of said ethylene-vinyl acetate copolymer.

14. A process in accordance with claim 13 wherein said ethylene-vinyl acetate copolymer comprises between 28 and 40% by weight vinyl acetate, based on the total weight of said ethylene-vinyl acetate copolymer.

15. A process in accordance with claim 10 comprising blending at least one lubricant, present in a concentration in the range of between 1 and 6 parts by weight, per 100 parts of said vinyl chloride polymer into said mixture.

16. A process in accordance with claim 15 comprising blending a pigment, present in a concentration in the range of between 0.1 and 20 parts by weight, per 100 parts by weight of said vinyl chloride polymer, into said mixture.

* * * * *